Patented Feb. 2, 1937

2,069,336

UNITED STATES PATENT OFFICE 2,069,336

PRODUCTION OF DERIVATIVES OF POLY-HYDRIC ALCOHOLS

Otto Schmidt, Ludwigshafen-on-the-Rhine, and Egon Meyer, Mannheim, Germany, assignors to I. G. Farbenindustrie Aktiengesellschaft, Frankfort-on-the-Main, Germany No Drawing. Original application May 13, 1931, Serial No. 537,210. Divided and this application March 18, 1933, Serial No. 661,578. In Germany May 22, 1930

8 Claims. (Cl. 260—151)

The present invention relates to derivatives of polyhydric alcohols and a process of producing same.

As has been set forth in our Patent No. 1,959,930, dated May 22, 1934, of which this application is a division we have found that valuable derivatives of polyhydric alcohols are obtained by etherifying part of the hydroxyl groups in aliphatic polyhydric alcohols, including their polyhydric derivatives or substitution products, containing more than 3 carbon atoms in the molecule, with aliphatic substances which contain at least 6, preferably from 10 to 18, carbon atoms in the molecule.

Among the said higher alcohols and their derivatives may be mentioned, for example, pentaerythritol, hexitols, various kinds of sugars, carbohydrates or their hydrogenation products, such as sorbitol, as well as the derivatives and substitution products of these substances, as for example the hydroxy-alkyl ethers obtainable by the action of alkylene oxides on polyhydric alcohols, such as for example the hydroxy-alkyl ethers of glycerol, pentaerythritol or sorbitol and like derivatives, such as alkyl, cycloalkyl, aryl or aralkyl ethers; suitable ethers are for example the methyl, ethyl, butyl, hexyl or cyclohexyl ethers.

In order to introduce the substances with at least 6 carbon atoms in the molecule, alkyl, or hydroxy-alkyl halides (halogenhydrins), alkylene oxides, as for example hexylene or dodecylene oxides, alcohols and the like may be employed. It is often preferable to carry out the reaction in inert solvents, such as hydrocarbons, ethers and the like.

For example the mono-hydroxy-dodecyl ether of sorbitol hexa-hydroxy-ethyl ether may be obtained by acting with about 1 molecular proportion of dodecylene chlorhydrin on about 1 molecular proportion of sorbitol hexa-hydroxy-ethyl ether in the presence of an equivalent quantity of alkali, or the said sorbitol hexa-hydroxy-ethyl ether may be employed in the form of its alkali metal compound. If free alcohols be employed, acid agents capable of removing water such as zinc chloride or concentrated sulphuric acid, are advantageously employed.

It will easily be understood that the products according to the present invention correspond to the general formula

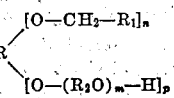

in which R denotes an aliphatic radicle containing at least 4 carbon atoms, $R_1$ an aliphatic radicle containing at least 5, preferably from 9 to 17 carbon atoms, and $n$ is any integral number corresponding to the number of carbon atoms of R less at least 2, $R_2$ is an aliphatic radicle, $m$ any integral number and $p$ is any integral number above 1 and is at the most the number of carbon atoms of R less $n$.

The products thus obtained have important properties. Most of them are readily soluble in water, or at least easily emulsifiable in water, although they contain a large number of carbon atoms in the molecule, such as sorbitol hexahydroxy-ethyl ether, and generally those containing at least two free hydroxyl groups or several hydroxy-alkyl groups.

The more or less easily water-soluble ethers which are obtainable from the said polyhydric alcohols and their derivatives, as for example sorbitol hexa-hydroxy-ethyl ether, by subsequent treatment with high molecular halogen paraffins, halogenated hydroxy paraffins or halogenated olefines or carboxylic acids and the like are valuable wetting, cleansing and dispersing agents, without possessing with few exceptions, the disadvantages of basic or acid groups either as such or in the salt form hitherto inherent to the substances usually employed as wetting agents.

The said wetting, cleansing, dispersing and the like agents may be advantageously employed for example in the textile industry for washing, carbonizing, dyeing, printing, rendering fibres soft and flexible and like purposes, in spinning artificial threads as additions to the precipitating baths or to the spinning solutions, and also in the leather industry, for example in soaking hides, in the cleaning industry for the preparation of cleaning agents of all kinds. Boring agents and lubricants having excellent properties may also be prepared with the aid of the said substances. They may be employed in acid, alkaline or neutral liquors with or without additions. Condensation products which still contain several free hydroxyl groups have proved especially advantageous for wetting and emulsifying purposes.

Moreover, the ethers obtainable according to the present invention which are difficultly soluble or insoluble in water but which are easily emulsified in water or aqueous solutions also possess valuable properties, for example they may be employed as soft resins or waxes for softening, sizing and like purposes in the textile industries in the preparation of numerous artificial materials or they may be converted into products valuable as assistants in the textile industries by sulphonation.

The following example will further illustrate the nature of this invention, but the invention is not restricted to this example. The parts are by weight.

*Example*

11.6 parts of sodium are dissolved in 200 parts of anhydrous ethyl alcohol, and 220 parts of sorbitol hexa-hydroxy-ethyl ether are then added and the solution is heated under reflux for several hours. The ethyl alcohol is then evaporated in vacuo whereby the mono-sodium compound of the aforesaid ether is obtained as a tough, vitreous mass. This product is then heated for 14 hours at 160° C. in a closed vessel provided with a stirring device together with 110 parts of 1.2-dodecylene-chlorhydrin and is then dissolved in water after cooling to room temperature. Remainders of the chlorhydrin are removed and the solution is rendered weakly acid with the aid of dilute hydrochloric acid, rendered neutral with aqueous soda solution and decolorized, if necessary, with decolorizing carbon. The water is then evaporated and the reaction product is recovered from the solid residue containing salt by extraction with ethyl alcohol. After evaporating the alcohol a yellowish, viscous oil is obtained which is completely soluble in water and consists apparently of the mono-hydroxy-dodecyl ether of sorbitol hexa-hydroxy-ethyl ether:

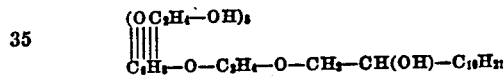

The yield is from 80 to 85 per cent of the theoretical yield calculated on the chlorhydrin employed.

The product possesses a high wetting power, and a colorless clear 0.5 per cent aqueous solution, for example, has a strong wetting effect even in the presence of alkaline or acid agents or of calcium compounds so that hard water may be employed for the solution in contrast to soaps and other wetting agents a large number of which are precipitated by calcium compounds. In the place of the said ether a 0.3 per cent aqueous solution of the mono-hydroxy-decyl ether of the tetra-hydroxy-ethyl ether of penta-erythritol may be employed.

Instead of the sorbitol hexa-hydroxy-ethyl ether, poly-hydroxy-ethyl ethers of sorbitol may be employed in which several poly-ethylene ether groups (—O—C$_2$H$_4$—O—C$_2$H$_4$—O—C$_2$H$_4$OH) are connected to one or more hydroxy groups of the original sorbitol. Products prepared in this manner from the sorbitol poly-hydroxy-ethyl ethers and the chlorhydrin are generally similar to the product hereinbefore described but have a high solubility in water and may be employed for the same purposes as those described.

What we claim is:

1. Hydroxyalkyl ethers of polyhydric alcohols corresponding to the general formula

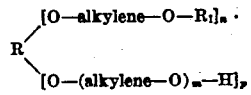

wherein R is an aliphatic group with at least 4 carbon atoms, R$_1$ represents a member of the class consisting of alkyl and hydroxyalkyl groups with at least 5 carbon atoms, $n$ being an integral number corresponding to the number of carbon atoms of R less at least 2, $m$ being any integral number from 1 to 6 and $p$ any integral number above 1 and at the most equal to the number of carbon atoms of R less $n$, the said hydroxyalkyl ethers being obtainable by introducing the group R$_1$ into $n$ hydroxyl groups of a compound

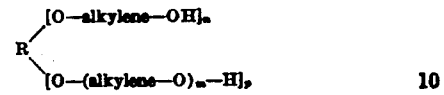

wherein the symbols R, $n$, $m$ and $p$ have the same meaning as above.

2. Hydroxyalkyl ethers of polyhydric alcohols corresponding to the general formula

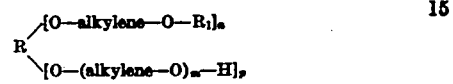

wherein R is an aliphatic group with at least 4 carbon atoms, R$_1$ represents a member of the class consisting of alkyl and hydroxyalkyl groups with from 9 to 17 carbon atoms, $n$ being an integral number corresponding to the number of carbon atoms of R less at least 2, $m$ being any integral number from 1 to 6 and $p$ any integral number above 1 and at the most equal to the number of carbon atoms of R less $n$, the said hydroxyalkyl ethers being obtainable by introducing the group R$_1$ into $n$ hydroxyl groups of a compound

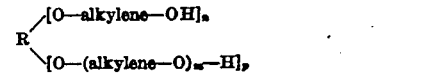

wherein the symbols R, $n$, $m$ and $p$ have the same meaning as above.

3. Hydroxyalkyl ethers of polyhydric alcohols corresponding to the general formula

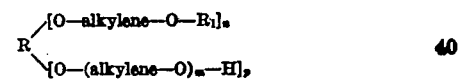

wherein R is an aliphatic group with from 4 to 6 carbon atoms, R$_1$ represents a member of the class consisting of alkyl and hydroxyalkyl groups with at least 5 carbon atoms, $n$ being an integral number corresponding to the number of carbon atoms of R less at least 2, $m$ being any integral number from 1 to 6 and $p$ any integral number above 1 and at the most equal to the number of carbon atoms of R less $n$, the said hydroxyalkyl ethers being obtainable by introducing the group R$_1$ into $n$ hydroxyl groups of a compound

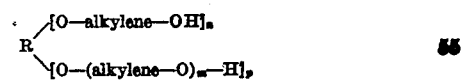

wherein the symbols R, $n$, $m$ and $p$ have the same meaning as above.

4. Hydroxyalkyl ethers of polyhydric alcohols corresponding to the general formula

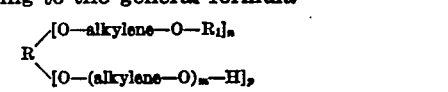

wherein R is an aliphatic group with from 4 to 6 carbon atoms, R$_1$ represents a member of the class consisting of alkyl and hydroxyalkyl groups with from 9 to 17 carbon atoms, $n$ being an integral number corresponding to the number of carbon atoms of R less at least 2, $m$ being any integral number from 1 to 6 and $p$ any integral number above 1 and at the most equal to the number of carbon atoms of R less $n$, the said hydroxyalkyl ethers being obtainable by introducing the group $R_1$ into $n$ hydroxyl groups of a compound

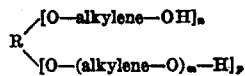

wherein the symbols $R$, $n$, $m$ and $p$ have the same meaning as above.

5. Hydroxyalkyl ethers of polyhydric alcohols corresponding to the general formula

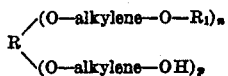

wherein $R$ is an aliphatic group with 6 carbon atoms, $R_1$ represents a member of the class consisting of alkyl and hydroxyalkyl groups with at least 5 carbon atoms, $n$ being an integral number from 1 to 4 and $p$ being 6 less $n$, the said hydroxyalkyl ethers being obtainable by introducing the group $R_1$ into $n$ hydroxyl groups of a compound $R-[O-alkylene-OH]_{n+p}$ wherein the symbols $R$, $n$ and $p$ have the same meaning as above.

6. Hydroxyalkyl ethers of polyhydric alcohols corresponding to the general formula

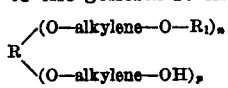

wherein $R$ is an aliphatic group with 6 carbon atoms, $R_1$ represents a member of the class consisting of alkyl and hydroxyalkyl groups with from 10 to 18 carbon atoms, $n$ being an integral number from 1 to 4 and $p$ being 6 less $n$, the said hydroxyalkyl ethers being obtainable by introducing the group $R_1$ into $n$ hydroxyl groups of a compound $R-[O-alkylene-OH]_{n+p}$ wherein the symbols $R$, $n$ and $p$ have the same meaning as above.

7. The compound corresponding to the formula:

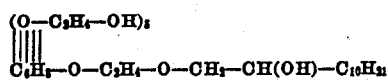

wherein the group $C_6H_8$ stands for the carbon chain of sorbitol and the hydrogen atoms directly attached thereto, the said compound being obtainable by reacting equimolecular amounts of the mono-sodium compound of sorbitol hexahydroxyethyl ether, and of 1,2-dodecylenechlorhydrin.

8. Hydroxyalkyl ethers of polyhydric alcohols corresponding to the general formula

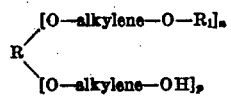

wherein $R$ is the hydrocarbon nucleus of sorbitol, $R_1$ is an aliphatic hydrocarbon radical containing from 10 to 18 carbon atoms, $n$ being an integral number from 1 to 6, and $p$ being an integral number equal to 6 minus $n$, the said hydroxyalkyl ethers being obtainable by introducing the group $R_1$ into $n$ hydroxyl groups of a compound

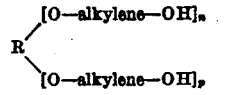

wherein the symbols $R$, $n$ and $p$ have the same meaning as above.

OTTO SCHMIDT.
EGON MEYER.